April 3, 1928.

J. W. PAGE

EXCAVATING SHOVEL

Filed June 14, 1926

1,664,940

Inventor:
John W. Page,
By Ogdenforth, Lee, Chritton & Wiles,
Attys.

Patented Apr. 3, 1928.

1,664,940

UNITED STATES PATENT OFFICE.

JOHN W. PAGE, OF CHICAGO, ILLINOIS.

EXCAVATING SHOVEL.

Application filed June 14, 1926. Serial No. 115,881.

Figure 1:
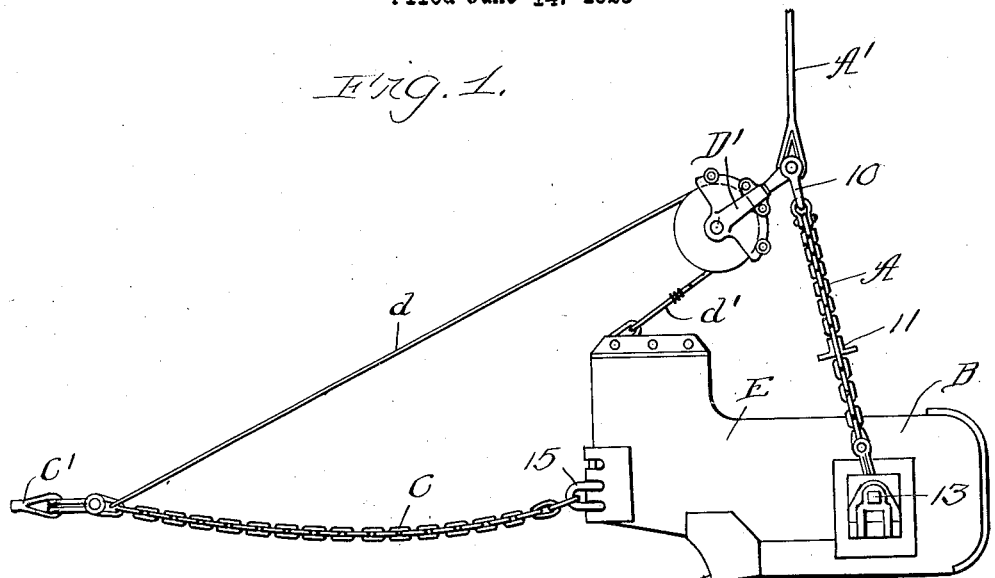
Figure 2:
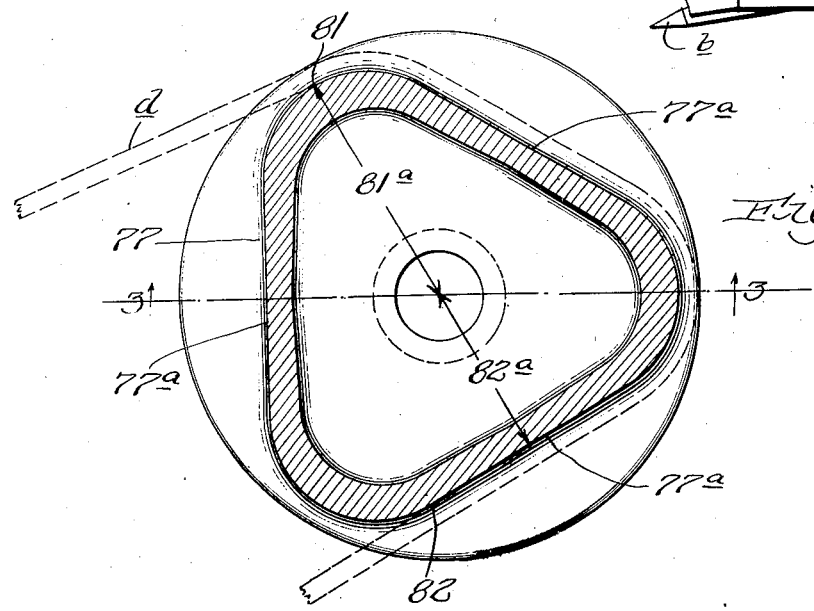
Figure 3:
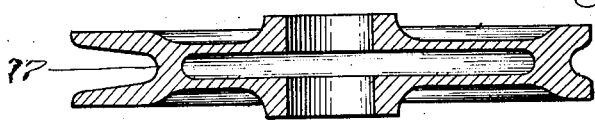

This invention relates to improvements in excavating shovels and is fully described and explained in this specification and shown in the accompanying drawings, in which—Figure 1 is a side view of my improved shovel, Fig. 2 is a vertical sectional view of the sheave forming a part of the device, and Fig. 3 is a view taken as indicated by the line 3 of Fig. 2.

The excavating shovel herein shown is of the same general type as, and an improvement on, the shovels shown in my Patent No. 758,380 dated April 26, 1904, my Patent No. 916,772 dated March 30, 1909, my Patent No. 1,532,775 dated April 7, 1925, and my Patent No. 1,491,414 dated April 22, 1924. The particular features of difference between this shovel and the shovels shown in said patents will be particularly pointed out herein.

Referring to the drawings, A indicates chains pivotally attached to the sides of the shovel at their lower ends and having their upper ends fastened to a clevis 10, for the attachment of a cable A' by which the shovel can be lifted. The chains A are separated by a spreader-bar 11, above the shovel to form a sort of bail.

B indicates the shovel proper which is pivotally secured to the lower ends of the chains A, the points of connection between the chains A and the shovel being behind the center of gravity of the shovel, so when released the shovel will swing down and dump its contents as is particularly set forth in Patent No. 758,380 granted April 26, 1904, referred to above. Pivotal connections between the lower ends of the chains A and the shovel are indicated by 13. The front lower corner of the shovel is provided with a cutting-edge indicated by $b$. The sides of the shovel, as indicated by E, project slightly forward of the cutting-edge $b$. To the front edges of the sides E are fastened eyes 15, to which are attached the chains C which perform the same function as the two small hauling-ropes C, of my Patent No. 758,380, and the same function as the hauling-bail C of my Patent No. 916,772. The hauling chains C are connected at their forward ends to the hauling-rope C'.

The block D' is attached to the lower end of the lifting cable A', where it is fastened to the clevis 10. Over this block runs a holding rope $d$, one end of which is secured to the ends of two short holding-chains $d'$ which are secured to the upper forward corners of the sides E of the shovel. The other end of the holding-rope $d$, is fastened to the point of attachment of the hauling-chains C to the main holding-rope C'. This shovel differs from the shovels shown in the patents referred to, in the construction, arrangement and operation of the block D' and holding-rope $d$, passing over the same. These parts will be described more in detail hereinafter.

In general, my shovel works the same as the shovel of patents referred to, each one of the parts doing all that is done by the corresponding parts of the shovels of said patents. Thus, when it is desired to excavate with my shovel, the hauling-rope C' can be drawn in by a suitable engine, and the shovel will fill itself with earth in the ordinary way. Thereupon the shovel can be raised by a derrick, if desired, and it will be maintained in a horizontal position as long as tension is maintained on the hauling-rope C'. As the shovel is lifted it is held in horizontal position as long as the main hauling-rope C' is held taut, the force for holding the shovel horizontal passing to it at times through the short hauling-chains C, at other times through the holding-rope $d$, and at times through both. The holding-rope $d$, keeps the shovel in a horizontal position only when it is kept under tension by the tautness of the hauling-rope C'. As soon as tension on the hauling rope C' is released, therefore, regardless of the elevation of the shovel, both means for holding the shovel in a horizontal position are released and its own weight swings it down so as to dump its contents.

It will be noted that when the shovel is to be held in a horizontal position by the holding-rope $d$, said holding-chain must be kept under tension by the tautness of the hauling-rope C'. It is desirable to maintain the requisite tension on the holding-rope $d$, to keep the shovel horizontal, without unnecessary tautness of the hauling-rope C'; since too much tautness on said hauling-rope C' is likely to swing the shovel out of the desired position for dumping. For this reason, it is desirable to provide means whereby a slight tautness of the hauling-rope C' will maintain sufficient tension on the holding-rope $d$, to keep the shovel in a horizontal position until it is ready to be dumped. However, in order to permit quick, free and complete dumping of the shovel, the holding-rope $d$, should be permitted to run over the block D' freely as soon as the hauling-rope C' is released for dumping the shovel. In my improved shovel these features are accomplished. When the shovel is in a horizontal position, a slight tautness on the hauling-rope C' serves to maintain sufficient tension on the holding-rope $d$, to keep the shovel from dumping. As soon as this tautness is released, however, the holding-rope $d$, runs freely over the block D', permitting the shovel to dump completely and thoroughly. I will now describe in detail the construction, arrangement and operation of the parts by which these features are accomplished.

The block D' is provided with a sheave as shown in Fig. 2. This sheave, instead of having the usual circular groove for the cable $d$ to run upon, has a poly-sided groove 77, here shown as being three-lobed, that is, having three flattened sides or faces indicated by 77$^a$. Although I have shown the groove of the sheave as having three flattened faces, it is to be understood that this number may be varied without departing from the spirit of the invention. For example, it could have more than three such flattened surfaces, or could have only one or two. Also, if desired, one or more of the flattened surfaces or faces instead of being flat, could be substantially flat or curved. For example, the curvature of the faces could be elliptical or circular with a longer radius than the normal radius of the sheave.

When the shovel is in its horizontal or load-retaining position as shown in Fig. 1, with sufficient tension on the hauling rope C' to hold the shovel in this position, the sheave D' will be in substantially the position shown in Fig. 2. When in this position, it will be noted that there is a leverage in favor of the end of the holding-rope $d$ attached to the end of the hauling-rope C', so that but a slight tautness on said hauling-rope C' will serve to maintain sufficient tension on the holding-rope $d$ to prevent dumping of the shovel. This favorable leverage is due to the position of the sheave as shown in Fig. 2, from which it will be seen that the two radii to the two tangential junctions of the holding-rope $d$ with the groove are not equal. In Fig. 2, such tangential junction, on the upper side is indicated by 81, and the lower by 82. The effective leverage from point 81 is represented by the radius 81$^a$ and the effective leverage from the point 82 is represented by the radius 82$^a$. The radius 81$^a$ being longer than 82$^a$, it will be seen that there is a leverage in favor of the end of the rope $d$ attached to the hauling-rope C'. By this construction, the operator may have an advantage of approximately 1½ times in holding the shovel from dumping, over the ordinary circular sheave. In operation, when the shovel is lifted, the sheave naturally rolls until the leverage comes in favor of the hauling-rope, as explained above, and as shown in Fig. 2, and the sheave remains in this position until the hauling-rope C' is released for dumping.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim is new, and desire to secure by Letters Patent, is:

1. In a device of the class described, the combination with a suitable shovel, of supporting means pivoted thereto behind the center of gravity thereof, hauling means pivotally secured to the front of the shovel, a block attached to the supporting means, said block having a sheave with a flattened face, and a holding-rope running from the front of said shovel over said sheave to the hauling means.

2. In a device of the class described, the combination with a suitable shovel, of supporting means pivoted thereto behind the center of gravity thereof, hauling means pivotally secured to the front of the shovel, a block attached to the supporting means, said block having a sheave with a plurality of flattened faces, and a holding-rope running from the front of said shovel over said sheave to the hauling means.

3. In a device of the class described, the combination with a suitable shovel, of supporting means pivoted thereto behind the center of gravity thereof, hauling means pivotally secured to the front of the shovel, a block attached to the supporting means, said block having a three-lobed sheave, and a holding-rope running from the front of said shovel over said sheave to the hauling means.

4. In a device of the class described, the combination with a suitable shovel, of supporting means pivoted thereto behind the center of gravity thereof, hauling means pivotally secured to the front of the shovel, a block attached to the supporting means, a sheave in said block, and a holding-rope running from the front of said shovel over said sheave to the hauling means, said sheave being so shaped that as said holding-rope runs over said sheave, a leverage will be established at intervals in favor of the end of said holding-rope attached to said hauling means.

5. In a device of the class described, the combination with a suitable shovel, of supporting means pivoted thereto behind the center of gravity thereof, hauling means pivotally secured to the front of the shovel, a block attached to the supporting means, a sheave in said block, a holding-rope running from the front of said shovel over said sheave to the hauling means, and means whereby, as said holding-rope runs over said sheave, a leverage will be established at intervals in favor of the end of said holding-rope attached to said hauling means.

6. A block provided with a sheave having a flattened face for the purpose of increasing the leverage in favor of one end of a rope passing over said sheave.

7. A block provided with a sheave having a plurality of flattened faces for the purpose of increasing the leverage in favor of one end of a rope passing over said sheave.

8. A block having a three-lobed sheave for the purpose of increasing the leverage in favor of one end of a rope passing over said sheave.

In testimony whereof, I have hereunto set my hand this 10th day of June, A. D. 1926.

JOHN W. PAGE.